(12) United States Patent
Bartram et al.

(10) Patent No.: US 7,613,772 B2
(45) Date of Patent: Nov. 3, 2009

(54) METHOD FOR CONTEXT BASED DISCOVERY AND FILTERING OF PORTABLE COLLABORATIVE NETWORKS

(75) Inventors: Linda Ruth Bartram, Vancouver (CA); Michael Anthony Blackstock, Coquitlam (CA); Henk Gerardus Maris Spaay, North Vancouver (CA)

(73) Assignee: Colligo Networks, Inc., Vancouver, BC (CA)

( * ) Notice: Subject to any disclaimer, the term of this patent is extended or adjusted under 35 U.S.C. 154(b) by 441 days.

(21) Appl. No.: 10/206,009

(22) Filed: Jul. 25, 2002

(65) Prior Publication Data
US 2004/0019641 A1 Jan. 29, 2004

(51) Int. Cl.
G06F 15/16 (2006.01)

(52) U.S. Cl. .................. 709/205; 709/221; 709/225; 370/432; 370/390

(58) Field of Classification Search .......... 709/221, 709/205, 223, 225; 713/163; 345/716; 370/432, 370/390
See application file for complete search history.

(56) References Cited

U.S. PATENT DOCUMENTS

| | | | |
|---|---|---|---|
| 5,392,400 A | 2/1995 | Berkowitz et al. | |
| 5,493,692 A | 2/1996 | Theimer et al. | |
| 5,737,601 A | 4/1998 | Jain et al. | |
| 5,764,982 A | 6/1998 | Madduri | |
| 5,790,935 A | 8/1998 | Payton | |
| 5,854,893 A | 12/1998 | Ludwig et al. | |
| 5,867,799 A | 2/1999 | Lang et al. | |
| 5,890,152 A | 3/1999 | Rapaport et al. | |
| 5,894,556 A | 4/1999 | Grimm et al. | |
| 5,909,183 A | 6/1999 | Borgstahl et al. | |
| 5,918,014 A | 6/1999 | Robinson | |
| 6,018,738 A | 1/2000 | Breese et al. | |
| 6,029,171 A | 2/2000 | Smiga et al. | |
| 6,029,191 A | 2/2000 | Kurashima | |
| 6,058,106 A | 5/2000 | Cudak et al. | |
| 6,061,794 A | 5/2000 | Angelo et al. | |
| 6,069,896 A | 5/2000 | Borgstahl et al. | |
| 6,078,948 A | 6/2000 | Podgorny et al. | |
| 6,108,699 A * | 8/2000 | Moiin ....................... 709/221 |
| 6,114,970 A | 9/2000 | Kirson et al. | |

(Continued)

FOREIGN PATENT DOCUMENTS

EP 0 798 906 10/1997

(Continued)

OTHER PUBLICATIONS http://www.Kolabora.com/news/2004/01/08/p2p_as_collaborative_networks.htm.*

(Continued)

Primary Examiner—Thanh Tammy Nguyen
(74) Attorney, Agent, or Firm—Nixon Peabody LLP (57) ABSTRACT

A peer-to-peer collaborative network system is described. The peer-to-peer collaborative network system allows for the existence of a number of collaborative networks. Within the collaborative networks, users can interact in ways such as messaging, file sharing, resource sharing, and the like. The user will query other users on the network to determine which collaborative networks are active. The user can then select an active collaborative network without having to be invited there.

22 Claims, 10 Drawing Sheets

U.S. PATENT DOCUMENTS

| | | |
|---|---|---|
| 6,128,647 A | 10/2000 | Haury |
| 6,144,964 A | 11/2000 | Breese et al. |
| 6,148,328 A | 11/2000 | Cuomo et al. |
| 6,167,432 A | 12/2000 | Jiang |
| 6,185,613 B1 | 2/2001 | Lawson et al. |
| 6,185,618 B1 | 2/2001 | Brabson |
| 6,192,394 B1 | 2/2001 | Gutfreund et al. |
| 6,195,091 B1 | 2/2001 | Harple et al. |
| 6,202,094 B1 | 3/2001 | Grosser, Jr. et al. |
| 6,212,549 B1 | 4/2001 | Page et al. |
| 6,237,025 B1 | 5/2001 | Ludwig et al. |
| 6,237,026 B1 | 5/2001 | Prasad et al. |
| 6,256,663 B1 | 7/2001 | Davis |
| 6,259,701 B1 | 7/2001 | Shur et al. |
| 6,269,099 B1 | 7/2001 | Borella et al. |
| 6,282,183 B1 | 8/2001 | Harris et al. |
| 6,289,382 B1 | 9/2001 | Bowman-Amuah |
| 6,295,550 B1 | 9/2001 | Choung et al. |
| 6,295,588 B1 | 9/2001 | Wilson |
| 6,308,175 B1 | 10/2001 | Lang et al. |
| 6,314,420 B1 | 11/2001 | Lang et al. |
| 6,314,448 B1 | 11/2001 | Conner et al. |
| 6,334,141 B1 | 12/2001 | Varma et al. |
| 6,336,134 B1 | 1/2002 | Varma |
| 6,345,264 B1 | 2/2002 | Breese et al. |
| 6,351,762 B1 | 2/2002 | Ludwig et al. |
| 6,353,813 B1 | 3/2002 | Breese et al. |
| 6,370,562 B2 | 4/2002 | Page et al. |
| 2001/0001268 A1 | 5/2001 | Menon et al. |
| 2001/0002902 A1 | 6/2001 | Hamdi |
| 2001/0017843 A1 | 8/2001 | Yagyu et al. |
| 2001/0025329 A1 | 9/2001 | Sheikh et al. |
| 2001/0027479 A1 | 10/2001 | Delaney et al. |
| 2002/0086665 A1 | 7/2002 | Maggenti et al. |
| 2002/0173319 A1 | 11/2002 | Fostick |
| 2002/0196789 A1 | 12/2002 | Patton |
| 2003/0005114 A1* | 1/2003 | Shavit et al. ................. 709/225 |
| 2003/0012215 A1* | 1/2003 | Novaes ........................ 370/432 |
| 2003/0131141 A1 | 7/2003 | Springmeyer et al. |
| 2003/0226013 A1* | 12/2003 | Dutertre .................... 713/163 |
| 2004/0125121 A1* | 7/2004 | Pea et al. .................... 345/716 |

FOREIGN PATENT DOCUMENTS

| | | |
|---|---|---|
| EP | 0 588 415 | 1/2002 |
| WO | 01/13201 | 2/2001 |
| WO | 01/35211 | 5/2001 |
| WO | WO 01/53954 | 7/2001 |

OTHER PUBLICATIONS

Definition: Collaborative Networks, from Wikipedia, Internet: http://en.wikipedia.org/wiki/Colloborative/networks, printed Dec. 11, 2006, 1 page.

Definition: Computer Cluster, from Wikipedia, Internet: http://en.wikipedia.org/wiki/Computer_cluster, printed Dec. 11, 2006, 6 pages.

Definition: Peer-to-Peer, from Wikipedia, Internet: http://en.wikipedia.org/wiki/P2p, printed Dec. 11, 2006, 9 pages.

Good, Robin, "P2P As Collaborative Networks," Kolabora News, Online collaboration —Internet: http:// 222.kolabora.com/news/2004/01/08/p2p_as_collaborative_networks.htm (printed Dec. 11, 2006), Jan. 8, 2004, 3 pages.

* cited by examiner

METHOD FOR CONTEXT BASED DISCOVERY AND FILTERING OF PORTABLE COLLABORATIVE NETWORKS

FIELD OF THE INVENTION

The invention relates to the production of collaborative networks on a physical network.

BACKGROUND

Collaboration is a core component of knowledge-based and white-collar work. The proliferation of flexible networking technologies and portable computing devices has raised expectations of user-level applications for collaboration in a variety of situations—whether at the desk, at the water cooler, or away from the office. Architectures and user interfaces that do not support the various ways in which people actually work together hamper the effectiveness of current collaborative software. Additionally, approaches that rely on fixed device and network configurations limit the scope of where collaboration can occur to fixed scenarios.

In the physical world, real-time collaboration spans the gamut from quick, informal conversations to more structured meetings. People interleave several different conversations and collaborations throughout the workday. Depending on the type of interaction or meeting, the participants may be open to interactions with others outside the scope of the collaboration; for example, taking a phone call from one person while talking face-to-face with another. However, in some cases users want to restrict that access; for example, during a meeting the participants may not want to be disturbed by those outside their current physical location, or by others not currently participating in the meeting. The context of activity thus affects both availability (to whom the user chooses to be accessible) and whom the user wants to see (relevant people). Moreover, how the user enters into an activity varies. Sometimes, she may join an activity with co-workers, she may be invited to join a session already in progress, she may discover that others are meeting about a topic of interest and join in, or, she may enter a specified physical location handled by a larger network and wish to identify herself to potential collaborators nearby. Often, these collaborations are part of a larger fixed physical network, and the user wants to monitor when relevant activity is occurring and who is involved; for example, an impromptu meeting in the development group about a certain project.

The basic problem is that the number of devices on a physical network is potentially extremely large (e.g., enterprise LAN, public wireless network, Internet). This makes it difficult for people who wish to collaborate with one another to find one another easily.

In addition to this, the members and activities on this network may be related to one another in one context (e.g., same or similar physical location or project), and unrelated to each other in another context (different activity or department), where the term "context" includes aspects of physical location, time, and purpose of collaboration.

For example, a large network may be set up in a large public location or enterprise with 1000 potential collaborators. Five of those members may want to collaborate with one another to exchange information in a local area (a specific meeting room), and/or for a specific purpose (development project). Other people in the same location may be collaborating for another project/purpose and may wish to either include or exclude others nearby.

Another problem related to this is that it is difficult to find and participate in ad hoc or very dynamic activities on a large physical network based on location, similar goals, purpose or department. That is, it should be possible to quickly and easily identify and participate in a shared context or session that is effectively a subset of the current physical network without needing to be explicitly invited to that activity/context by a current participant.

SUMMARY OF THE PRESENT INVENTION

Exemplary embodiments of the present invention relate to a peer-to-peer network comprising units operably connected to the peer-to-peer network. The units having software to produce collaborative networks between at least some of the units. The software adapted to determine which collaborative networks are active on the peer-to-peer network by querying units on the peer-to-peer network. The software adapted to enable the use of one of the units to select an active collaborative network determined from another user. The software allowing collaborative interactions among units connected to an active collaborative network.

Additional exemplary embodiments of the present invention are related to a method. The method comprises determining which collaborative network is active on a peer-to-peer network by querying units on the peer-to-peer network. At a first unit on a peer-to-peer network, selecting one of the collaborative networks determined from another unit. The method also comprises collaborating with other units connected to the selected active collaborative network.

Further exemplary embodiments are directed to a method. The method comprises determining what units are on a peer-to-peer network and using a user interface to create a new selectable collaborative network. The new collaborative network is made known to the units on the peer-to-peer network. The method also comprises receiving from at least one of the units an indication that that the at least one of the units has joined the new collaborative network; and collaborating with a unit connected to the new collaborative network.

BRIEF DESCRIPTION OF THE INVENTION

Figure 1:
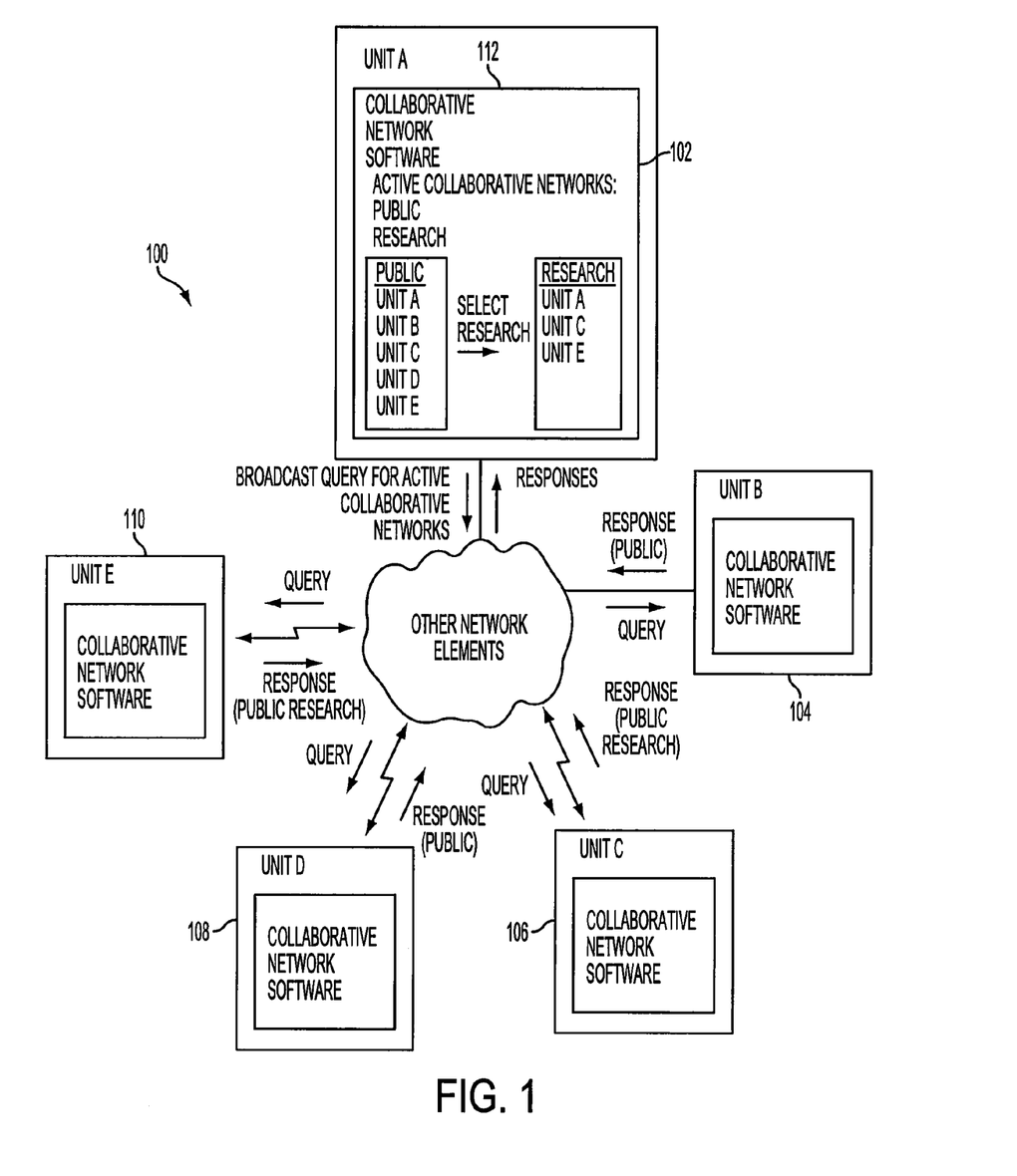
FIG. 1 is a diagram that illustrates an embodiment of the system of the present invention.

An exemplary embodiment of the present invention concerns a peer-to-peer network, such as the peer-to-peer network 100 of FIG. 1, that includes a number of units. In example of FIG. 1, the units include unit 102, unit 104, unit 106, unit 108, and unit 110. The units have software, to produce collaborative networks between at least some of the units. In the example of FIG. 1, unit 102 has collaborative network software 112.

Collaborative networks are networks that allow collaborative interaction among users of a unit connected to the collaborative network. The collaborative activities can include messaging, data sharing, and other forms of information exchange. U.S. patent application Ser. No. 10/043,207 provides a description of a system for the efficient formation of peer-to-peer networks for a collaboration based on shared unique identifiers without the need for a server. This patent application is incorporated herein by reference.

The peer-to-peer network can run on any type of physical network such as a local area network (LAN), a wireless LAN, or the Internet.

The peer-to-port computer network includes "public" collaborative network including all of the units on the peer-to-peer network. In addition to the "public" collaborative network, additional context based collaborative networks can be set up with the system of the present invention.

In an exemplary embodiment of the present invention, the software is adapted to determine which collaborative networks are active on the peer-to-peer network by querying units on the peer-to-peer network. In the example of FIG. 1, the unit 102 queries each of the other units on the peer-to-peer network. In example of FIG. 1, the other units respond with an indication of which collaborative networks are active. In this example, units 104 and 108 respond indicating that they are active on both the "public" collaborative network while units 106 and 110 indicate they are active on the "public" and the "research" collaborative networks. The unit 102 receives the indications of which units are associated with which active collaborative network.

In an exemplary embodiment, the software is adapted to enable a user of one of the units to select an active collaborative network determined from another unit or to create a new collaborative network. In example of FIG. 1, a user can use the software 112 to select the "research" collaborative network, the existence of which was determined from units 106 and 110.

In an exemplary embodiment, the software allows collaborative interactions among units connected to an active collaborative network. In the example of FIG. 1, a user at unit 102 uses the software 112 to select the "research" collaborative network.

Figure 8:
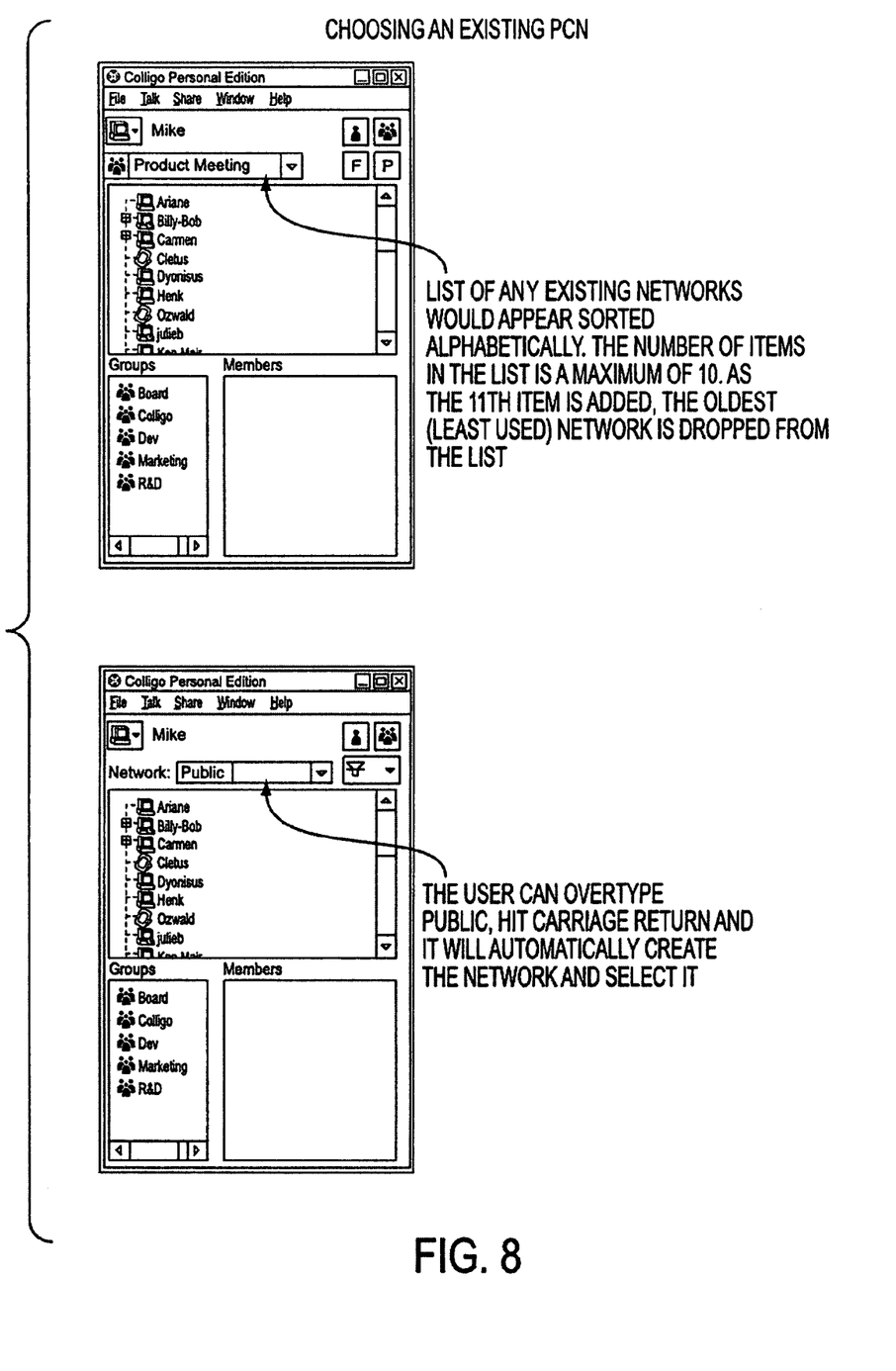
FIG. 8 is a diagram that illustrates using and creating a collaborative network.
Figure 9:
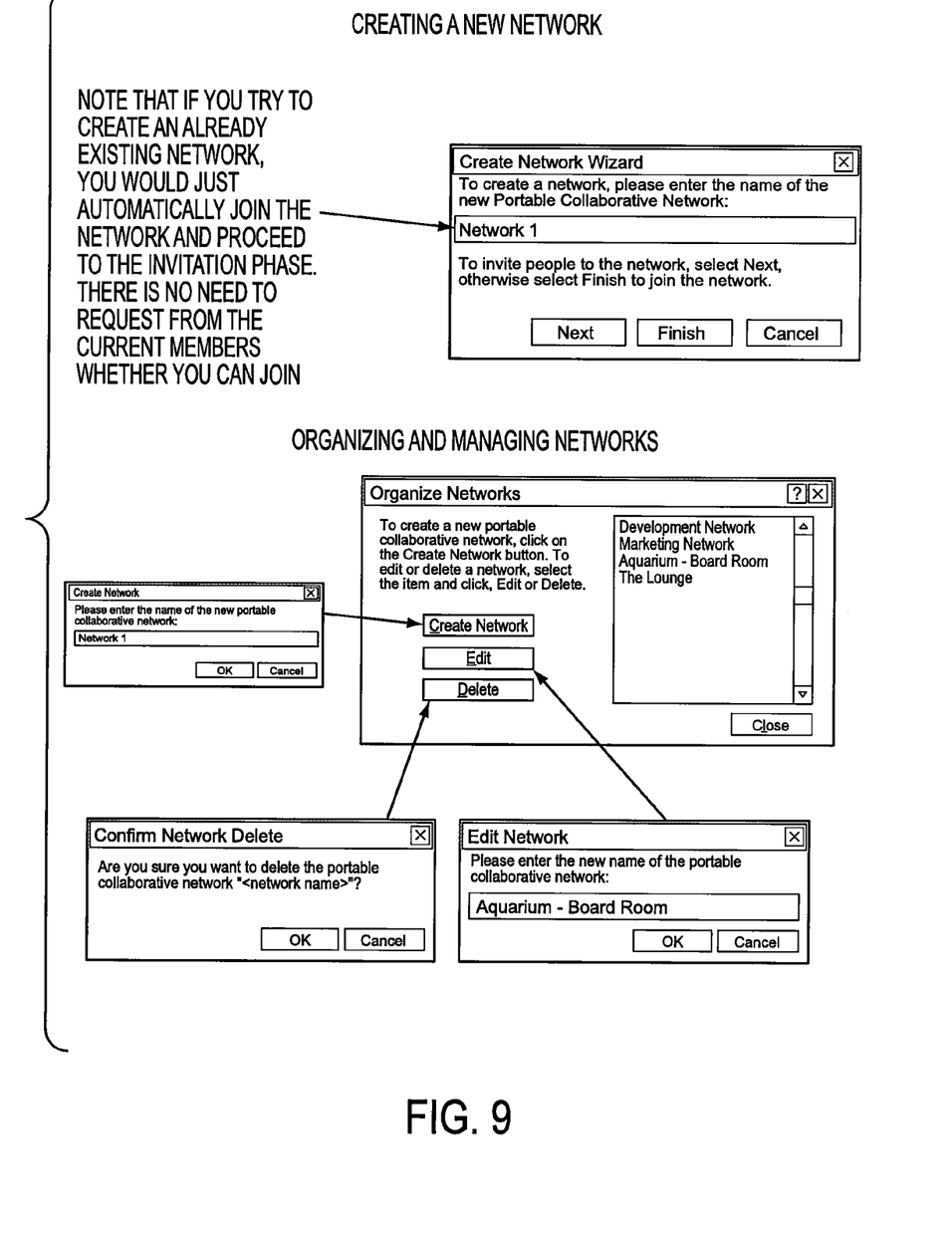
FIG. 9 is a diagram that illustrates creating and organizing collaborative networks.
Figure 10:
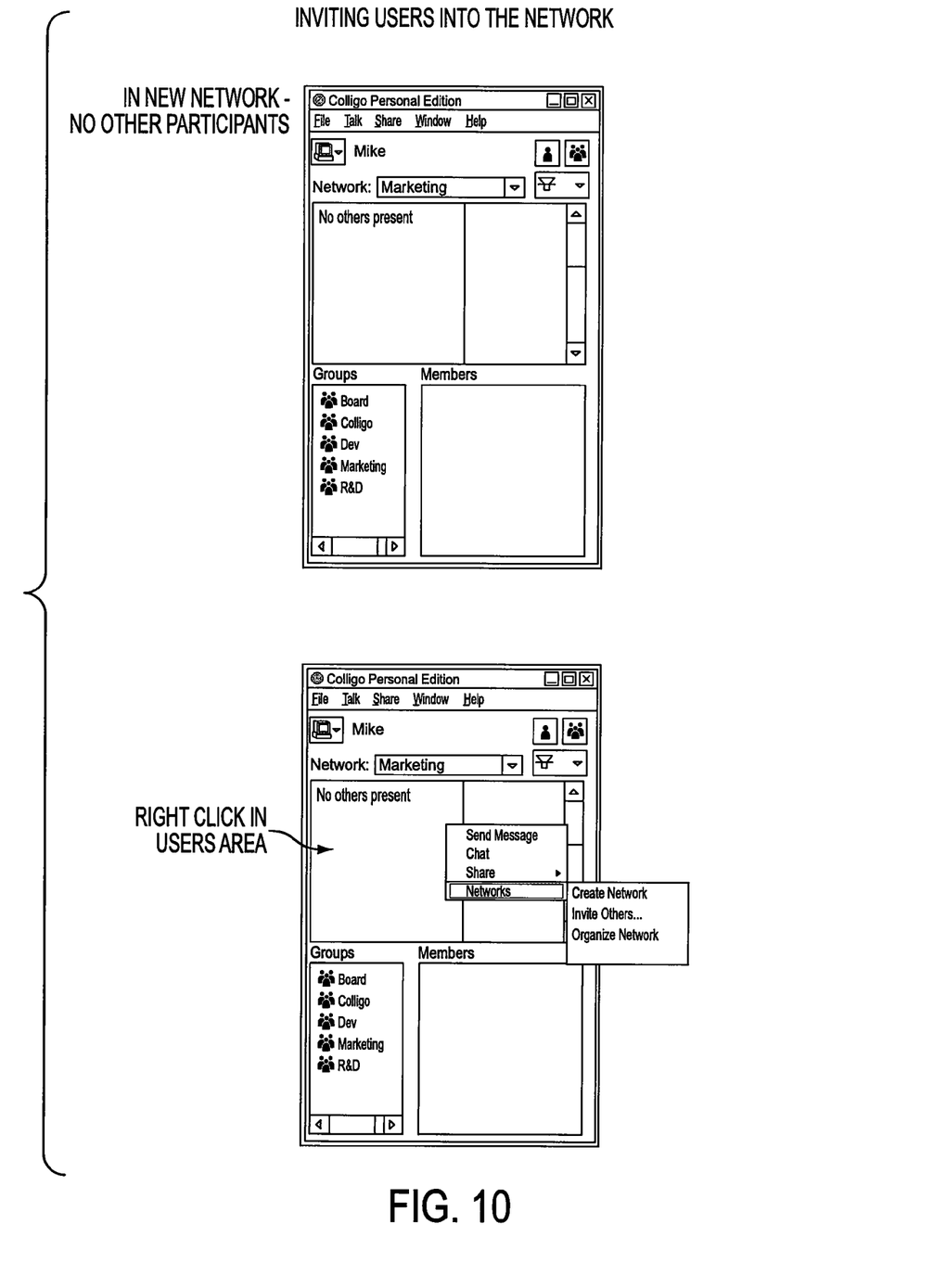
FIGS. 10 and 11 are diagrams that illustrate inviting users to a collaborative network.
Figure 11:
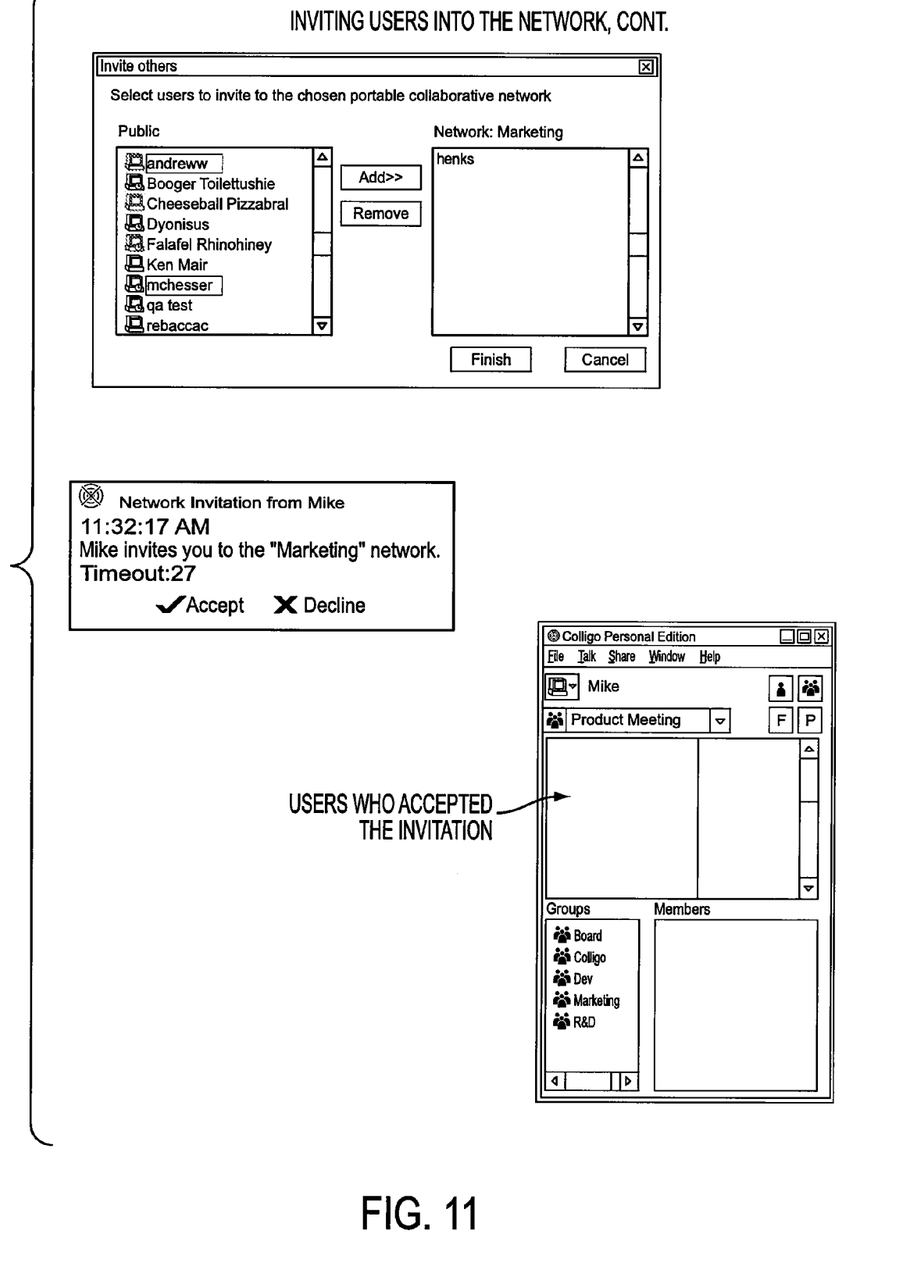

In one embodiment, the software is adapted to create a new collaborative network and make it known to other participants on the peer-to-peer network. For example, in one system, the user can create a new collaborative network by defining a new PCN and assigning it a unique name and "join" it by choosing it as the active PCN, as illustrated in FIGS. 8 and 9.

Figure 7:
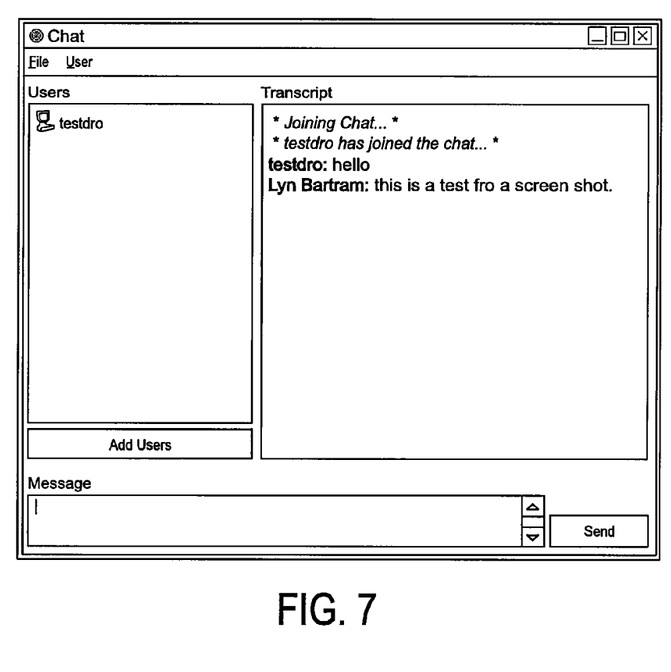
FIG. 7 is a diagram that illustrates a collaborative interaction using a collaborative network.

In an exemplary embodiment, the software allows collaborative interactions among units connected to an active collaborative network. The collaborative activities include messages, file sharing and other forms of informational exchange. FIG. 7 illustrates a group chat in a collaborative network that can be used with the system and method of the present invention.

Figure 2:
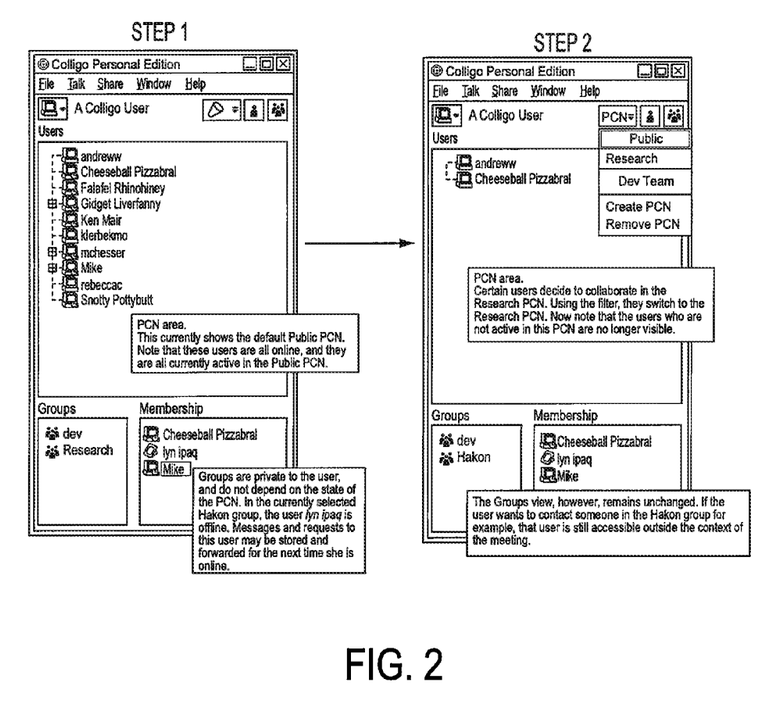
FIG. 2 is a diagram of an interactive user interface used with one embodiment of the system of the present invention.

In an exemplary embodiment, the collaborative network software uses an interactive user interface to allow the creation or selection of the active collaborative network. FIG. 2 illustrates an example of a case where a user moves from a "public" collaborative network to a "research" collaborative network. FIGS. 8-11 illustrate an example where a user creates a new network.

In one embodiment, units respond to a query with indications of the active collaborative network of which the user is a member. The software produces a display of the active collaborative networks at the unit that produced the query.

In one embodiment, the software responds to indications of active collaborative networks. In one embodiment, the software produces a display of the possible collaborative networks. The advantage of having a peer-to-peer network is that a central server need not keep track of all of the different collaborative networks. Each of the units acting as a peer keeps track of which active collaborative network it is a part of and this information is discoverable by the other units who connect to the network and have other collaborative networks.

One exemplary embodiment of the present invention is a method comprising determining which collaborative networks are active on a peer-to-peer network by querying the units on the peer-to-peer network. In example of FIG. 1, the unit 102 queries each of the active units 104, 106, 108 and 110. The method also includes, at a first unit on a peer-to-peer network, selecting one of the active collaborative networks determined from another unit. In example of FIG. 1, the user at the unit 102 can select the "research" collaborative network determined from units 106 and 110. The method also includes collaborating with other units connected to the selected active collaborative network. In example of FIG. 1, when unit A selects the "research" collaborative network the user at the unit 102 can collaborate with the users at units 106 and 110.

Another embodiment of the present invention is a computer-readable medium containing a program which executes a procedure. The computer-readable medium can be a storage associated with the collaborative network software 112 on unit 102 shown in FIG. 1. The procedure includes determining which collaborative networks are active on a peer-to-peer network by querying the units on the peer-to-peer network. Under user control, selecting one of the active collaborative networks determined from another unit. The procedure also includes allowing collaborative interactions with other units connected to the selected active collaborative network.

In one embodiment, the collaborative network can be considered to be a portable collaborative network (PCN) since it can be set up anywhere, overlay any physical network and is created as needed for the purpose of collaboration activities. In one embodiment, the user can create, participate in, and switch between multiple collaborative networks. A user can be active in at least one collaborative network; typically the top level "public" or "on-line" collaborative network includes all current users of the collaborative network software on the physical network.

Figure 4:
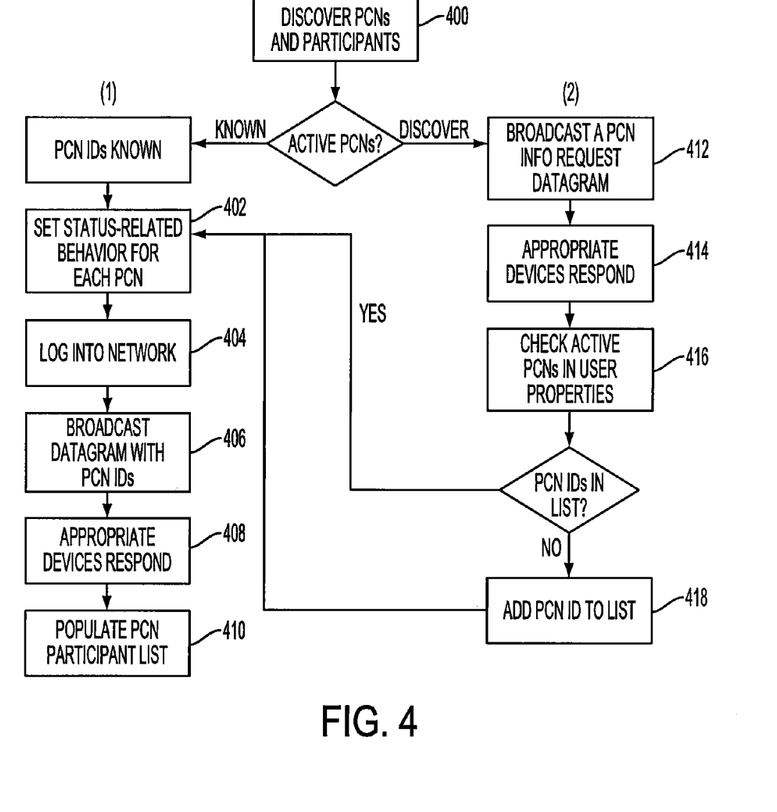
FIG. 4 is a flow chart that illustrates the operation of one embodiment of a system to determine a collaborative network in a peer-to-peer manner.
Figure 5:
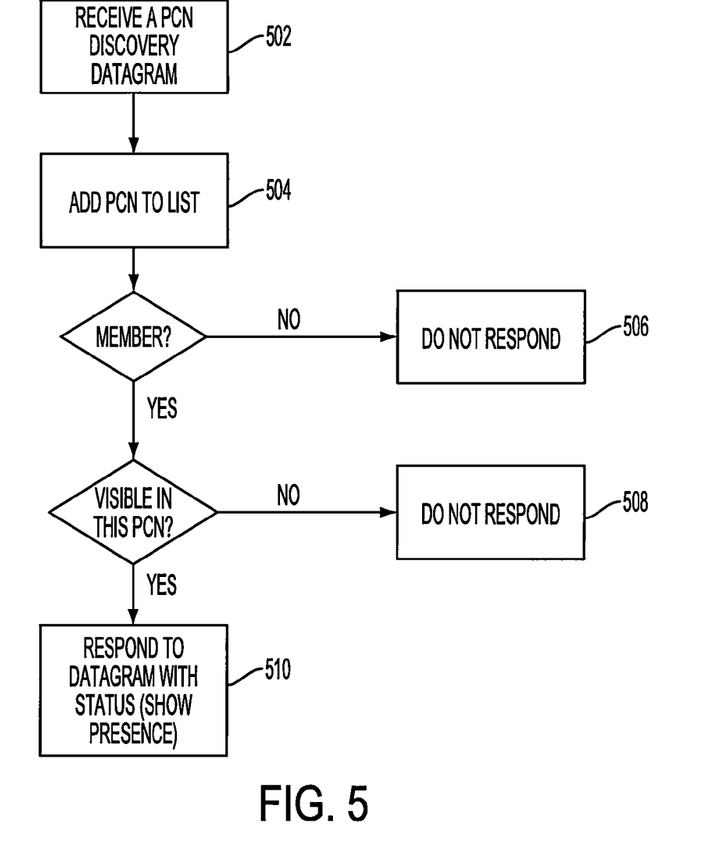
FIG. 5 is a flow chart that illustrates a response of a unit to a query concerning a specific portable collaborative network.
Figure 6:
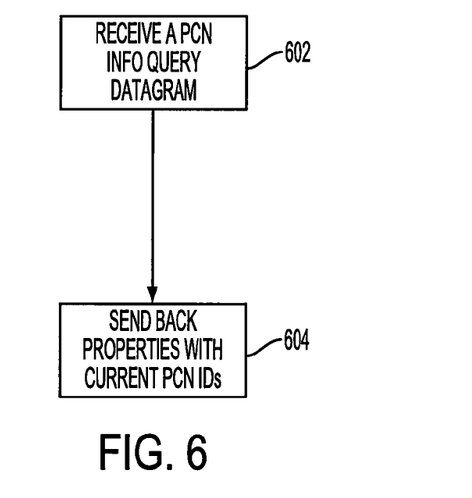
FIG. 6 is a flow chart that illustrates the response of one unit embodiment to a general query of the units of the network.

FIGS. 4, 5 and 6 illustrate examples of methods for implementing embodiments of the system of the present invention. FIG. 4 shows a method of discovering collaborative networks. In step 400, collaborative networks and participants are discovered. If there are known active collaborative networks, the software in step 402 sets status-related behavior for each collaborative network. In step 404, the user can log in or select a collaborative network. In step 406 the user can broadcast a datagram with collaborative network IDs. This effectively acts as a query to determine which units on the network are part of the collaborative network. In step 408, the units connected to the active collaborative network(s) respond. In step 410, the user produces a collaborative network participant list from the responses produced by the units where there are active participants. If collaborative networks are discovered, in step 412, a collaborative network information request is broadcast in 412. In step 414, the units which have active collaborative networks respond. In step 416, the discovery of an active collaborative network is compared to the stored values of active collaborative networks. If the collaborative network is in the list, status-related behavior for each portable collaborative network is set in step 402. If the collaborative network is on the list, in step 418, the new active collaborative network ID is added to the list.

FIG. 5 illustrates an example of how a unit responds to a collaborative network discovery datagram. In step 502, a collaborative network discovery datagram is received. In step 504, the collaborative network for the datagram is added to the list. If the unit receiving the collaborative network discovery datagram is not a member of the portable collaborative network, in step 506, the unit does not respond. If the unit is a member of the collaborative network but is not visible in the collaborative network, in step 508, the unit does not respond. If the unit as well as the member are visible in the collaborative network, the unit responds in step 510 showing the status.

In the example of FIG. 6, in step 602, a collaborative network info query datagram is received. In step 604, properties with the current collaborative network ID are sent in response to the query.

The collaborative network user can include synchronization tools, collaboration tools, and the sharing of printers, files, databases and the like.

In one embodiment, a user can have a status in a collaborative network. Examples of user status include unavailable, available and busy. A variety of other statuses can also be used. A user can associate a status with each collaborative network. Thus, the user can have different statuses in different portable collaborative networks.

An advantage of one embodiment of the system in the present invention is that the users can discover and join a collaborative network without an invitation from other members of the collaborative network.

An additional advantage of the system of one embodiment is that units that do not respond are filtered out. That way, the user display of the members of the collaborative network does not include users that cannot be accessed at any given time. Additionally, the existence of a portable collaborative network can be determined subject to the user's preferred access control.

Collaborative networks can comprise a subset of members on a physical network who have defined the same or a shared context for collaboration individually. Participants are identified and discovered as members of this context by simply identifying themselves as participants. They create and share the information about the context, which then causes the context to exist, to be discoverable, and to allow the discovery of other members of the same context, excluding others on the physical network as needed.

A member can publish or indicate its current collaborative network participation in some way (for example, by associating a unique keyword or identifier with a collaborative network, or by indicating membership to a server). Collaborative network participation can be published via a device discovery mechanism. A peer-to-peer device discovery mechanism has the advantage that it does not rely on a central server. Servers can be used in hybrid peer-to-peer systems in which collaborative network information stored at the server is backed up with a peer-to-peer distribution of active collaborative network information.

By publishing collaborative network participation in some manner, a member can make himself available to (discoverable by) other users in other collaborative networks, can restrict access to only the other users in his collaborative network, or indicate current presence status to other collaborative network members differently from non-members.

For example, a collaborative network member can be "online" to other users in the same collaborative network, and indicate that the device is "busy" or "unavailable" to non-members or members of other collaborative networks to which the user is a member.

It is also possible for a member to participate in more than one collaborative network at a time, with a different status in each collaborative network. Collaborative networks can also be subsets of each other.

Members can be restricted to participating in only specific collaborative networks and subsets of these collaborative networks to partition a large physical network into hierarchies related to function, or location. The largest collaborative network that a user can participate in is usually referred to the "Public" collaborative network.

It is possible to discover other collaborative networks within a physical network (using multicast or using a server) without necessarily participating in such networks (members of other collaborative networks respond to collaborative network membership requests from non-participants, or server query). This same method can be used to restrict or enable collaborative network discoverability; for example a user can discover collaborative network peers only if she is a participant in that collaborative network (other members only respond to participant requests, or server query).

It is also possible to invite members to collaborative networks, or more generally, to inform other users of the existence of a collaborative network, by sending a message to members of a physical network containing the shared collaborative network information needed for participation. This could be done "inband" (i.e., using a multicast request-response handshake, a server posting) or "out-of-band" (i.e., telling someone verbally, sending them email, or phoning them). The other users can then decide whether or not to join by adding the collaborative network to their list.

Moreover, collaborative network active membership can be configured to automatically change the way information and communications are delivered to that user from others not in that particular collaborative network. For example, messages from users not in the collaborative network may be stored and delivered later to avoid interrupting an active collaboration session.

An interactive user interface allows a user to define the collaborative networks of current interest and to rapidly participate in and discover other users in collaborative networks. FIG. 2 shows one such user interface in the current embodiment where the user "filters context" using a collaborative network pull-down menu. The user can define and store multiple collaborative network identifiers that may be shared with other users.

Although in the current embodiment a user is active in only two collaborative networks at a time (public/world and the current selection), it is possible to extend it to support membership in any number of collaborative networks (for example, by increasing the number of instances of the interactive user interface window; e.g., collaborative network windows).

Figure 3:
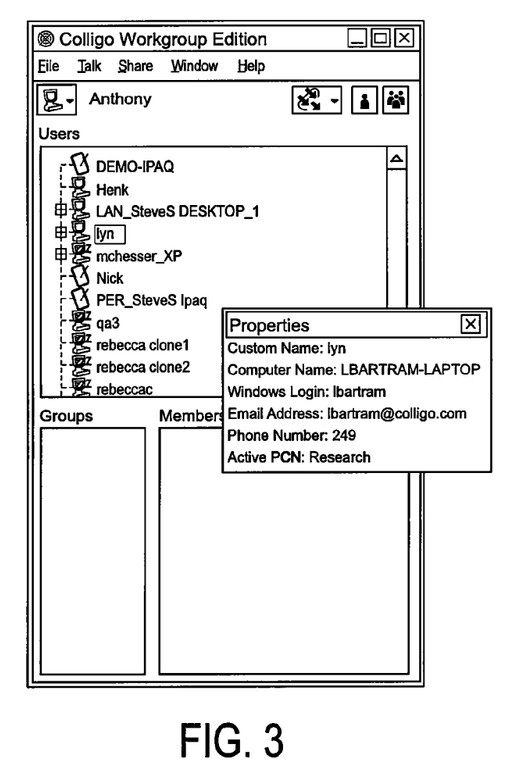
FIG. 3 is a diagram that illustrates a user interface for use in one embodiment of the present invention.

In addition, this user interface can help the user discovery the active collaborative networks themselves and add their information to his set of collaborative networks, listed in the pull-down menu in FIG. 2. As shown in FIG. 3, the user can inspect another peer's published "Properties" to discover that peer's current collaborative network.

The resulting visualization of collaborative networks and the ability to see only one at a time allows users to discover and to easily move between contextually relevant groupings (i.e., related to purpose, location or activity).

The list of users in any collaborative network can be additionally filtered by resource and service providers (currently file and printer sharing).

In addition to shared collaborative networks, users may also create individual groups that are not shared but remain private. Like traditional distribution or buddy lists, these groups contain members independent of their visibility or membership in any current collaborative network other than the default "public" or "on-line" collaborative network. That is, whether or not a user is discoverable in a particular collaborative network does not dictate his visibility or published status in a group. Once added to a group, a member's listing remains in that group, but its status indicator (offline, busy, etc) corresponds to the status in the Public collaborative network. Thus, when a peer in a group is offline, he will not appear in any collaborative network including the Public one, but his entry in the group list will persist and his status will be displayed as offline (see FIG. 2).

In one embodiment, both the underlying shared collaborative network mechanism and the resulting user interface are lightweight, requiring few screen or computational resources (basically the distribution and storage of a list of shared identifiers, or collaborative network IDs.) The user interface allows the user to easily view his collaborative networks and to see what other collaborative networks are active in a small space. This makes this method particularly suitable for smaller portable computing devices such as handhelds.

Context can be defined by shared properties, including but not limited to, user definition, keywords, ID or the same representing location, activity, purpose, department, project, etc. The one embodiment supports user-defined contexts (identified by shared keywords).

It is possible to filter members of collaborative networks further, that is within a collaborative network the user can additionally filter the view based on resource sharing (such as printers and files).

In one embodiment, "Public" is the largest collaborative network a member can participate in and generally corresponds to the physical network, unless it is too big (i.e., thousands of members). In which case, it can be partitioned by location, or in any other way into different "root collaborative networks" (publics).

In one embodiment, a member is always a member of a collaborative network. The status in a group corresponds to the status of that member in the "Public", or top-level collaborative network, which generally corresponds to the physical network (FIG. 3).

In one embodiment, the user can define and store multiple collaborative network IDs that may be shared with other users.

In one embodiment, an interactive user interface allows the user to easily select and view a collaborative network, and to set that collaborative network as the current one. Users do not always have to be invited to a collaborative network to join. In this way, one can flexibly identify and join others working in a shared context defined by a location, purpose, or other and join it, rather than having to be invited in some predefined way.

Although in the some embodiments a user is active in only two collaborative networks at a time ("Public" and the current selection), it is possible to support membership in any number of collaborative networks. For example, by increasing the number of instances of the interactive user interface window or increasing the number of currently selected collaborative networks using checkboxes.

In one embodiment, a member can be simultaneously discoverable in more than one collaborative network because he can publish/indicate membership in them easily.

In one embodiment, in addition, a member can control how his status information is shown to others any collaborative network including Public and thus, can choose to remain accessible even while participating in another.

In one embodiment, a member can control how communications from people in other collaborative networks are delivered (store and forward, email, deliver now).

In one embodiment, collaborative network members are discoverable from other collaborative networks. The current collaborative networks memberships are part of the user's "properties" information that can be requested by other users at any time (or requested from a central server). The response determines the visibility, which is controlled by the responder. This in turn allows a user to discover which collaborative networks are currently active even if the user does not have their current shared IDs, although access restrictions may prevent the user from actually obtaining an ID and joining the collaborative network.

In one embodiment, the system allows the responder to control responses restricting visibility as desired.

In one embodiment, collaborative networks are contextual containers for a group of participants and are identified by a common identifier shared among the participants such as keyword, number, etc.

In one embodiment, a list of possible collaborative networks is made available in a user interface, through which the user can switch between collaborative networks.

In one embodiment, the user interface includes a view of collaborative network membership, including the "public" collaborative network allows the user to discover active collaborative networks. Only members of the current collaborative network appear in a collaborative network view.

In one embodiment, the shared information that defines a collaborative network can be distributed in any number of ways; word of mouth, central server, discovery, invitation, email.

The approach of one embodiment of the present invention works well for varied network configurations. Each peer shares the notion of a collaborative network and communicates the user's current collaborative network activity, whether the presence information arises from a server, or from discovery in a peer-to-peer ad-hoc network.

Further exemplary embodiments are directed to a method. The method comprises determining what units are on a peer-to-peer network and using a user interface to create a new selectable collaborative network. In an exemplary embodiment, the units on the peer-to-peer network can be determined by querying the units or by the units sending an indication that it has joined the peer-to-peer network. The new collaborative network is made known to the units on the peer-to-peer network. In an exemplary embodiment, the existence of the new collaborative network is transmitted to the other units on the peer-to-peer network. The method also comprises receiving from at least one of the units an indication that that the at least one of the units has joined the new collaborative network. In an exemplary embodiment, the new collaborative network can be selected as discussed above. The method also comprises collaborating with a unit connected to the new collaborative network.

Additional modifications and improvements of the present invention may also be apparent to those of ordinary skill in the art such as increasing the number of partners or using a different type of peer-to-peer network. Thus the particular combination of parts described and illustrated herein is intended to represent only certain embodiments of the present invention, and is not intended to serve as limitations of alternative devices within the spirit and scope of the invention.

The invention claimed is:

1. A computer implemented method comprising: a first peer computing device in a peer-to-peer network sending a multicast message to an Internet Protocol (IP)-subnet, the multicast message comprising an identifier; receiving a unicast message from a second peer computing device on the IP-connected subnet having the same identifier, the unicast message comprising: an address resolvable to an IP address, of the second peer computing device; and other identification of the second peer computing device; updating a list identifying peer computing devices that have responded to indicate the address resolvable to the IP address and the other identification of the second peer computing device; determining which collaborative networks are active on the peer-to-peer network by querying the second peer computing device; selecting one of the active collaborative networks determined from the second peer computing device; and collaborating with the second peer computing device connected to the selected active collaborative network; further comprising: the first peer computing device maintaining a record of an interval since a last message from a peer computing device other than the first peer computing device; and when a pre-determined threshold is exceeded for the interval, removing the peer computing device other than the first peer computing device from the list.

2. The method of claim 1, further comprising periodically sending a message to the subnet to announce the presence of the first peer computing device.

3. The method of claim 1, further comprising the first peer computing device broadcasting a message announcing a departure of the first peer computing device from the subnet.

4. The method of claim 1 wherein the subnet is a wireless ad-hoc network.

5. The method of claim 1 wherein the identifier is pre-determined by a software configuration of the first peer computing device.

6. The method of claim 1, further comprising: at the first peer computing device, creating a new collaborative network; and announcing the new collaborative network to a second peer computing device on the peer-to-peer network.

7. The method of claim 1 wherein the selecting comprises using an interactive user interface.

8. The method of claim 1, further comprising receiving a response from the second peer computing device, the response indicating active collaborative networks of which the second peer computing device is a member.

9. The method of claim 1, further comprising producing a display of active collaborative networks.

10. The method of claim 1 wherein the collaborative network is configured for one or more of messaging and file sharing.

11. An apparatus comprising: an interface configured to communicate with a peer-to-peer network; and a processor configured to: send a multicast message to an Internet Protocol (IP)-connected subnet, the multicast message comprising an identifier, the apparatus comprising a first peer computing device on the IP-connected subnet; receive a unicast message from a second peer computing device on the IP-connected subnet having the same identifier, the unicast message comprising: an address resolvable to an IP address, of the second peer computing device; and other identification of the second peer computing device; update a list identifying peer computing devices that have responded to indicate the address resolvable to the IP address and the other identification of the second peer computing device; determine which collaborative networks are active on the peer-to-peer network by querying the second peer computing device; select one of the active collaborative networks determined from the second peer computing device; and collaborate with the second peer computing device connected to the selected active collaborative network; further comprising: the first peer computing device maintaining a record of an interval since a last message from a peer computing device other than the first peer computing device; and when a pre-determined threshold is exceeded for the interval, removing the peer computing device other than the first peer computing device from the list.

12. The apparatus of claim 11 wherein the processor is further configured to periodically send a message to the subnet to announce the presence of the first peer computing device.

13. The apparatus of claim 11, wherein the processor is further configured to broadcast a message announcing a departure of the first peer computing device from the subnet.

14. The apparatus of claim 11 wherein the subnet is a wireless ad-hoc network.

15. The apparatus of claim 11 wherein the identifier is pre-determined by a software configuration of the first peer computing device.

16. The apparatus of claim 11 wherein the processor is further configured to: create a new collaborative network; and announce the new collaborative network to the second peer computing device.

17. The apparatus of claim 11 wherein the processor is further configured to select the one of the active collaborative networks using an interactive user interface.

18. The apparatus of claim 11 wherein the processor is further configured to receive a response from the second peer computing device, the response indicating active collaborative networks of which the second peer computing device is a member.

19. The apparatus of claim 11 wherein the processor is further configured to produce a display of active collaborative networks.

20. The apparatus of claim 11 wherein the collaborative network is configured for one or more of messaging and file sharing.

21. An apparatus comprising: means for a first peer computing device in a peer-to-peer network sending a multicast message to an Internet Protocol (IP)-connected subnet, the multicast message comprising an identifier; means for receiving a unicast message from a second peer computing device on the IP-connected subnet having the same identifier, the unicast message comprising: an address resolvable to an IP address, of the second peer computing device; and other identification of the second peer computing device; means for updating a list identifying peer computing devices that have responded to indicate the address resolvable to the IP address and the other identification of the second peer computing device; means for determining which collaborative networks are active on the peer-to-peer network by querying the second peer computing device; means for selecting one of the active collaborative networks determined from the second peer computing device; and means for collaborating with the second peer computing device connected to the selected active collaborative network; further comprising: the first peer computing device maintaining a record of an interval since a last message from a peer computing device other than the first peer computing device; and when a pre-determined threshold is exceeded for the interval, removing the peer computing device other than the first peer computing device from the list.

22. A computer-readable storage medium comprising a program of instructions for execution and when executed operable to: at a first peer computing device in a peer-to-peer network, send a multicast message to an Internet Protocol (IP)-connected subnet, the multicast message comprising an identifier; receive a unicast message from a second peer computing device on the IP-connected subnet having the same identifier, the unicast message comprising: an address resolvable to an IP address, of the second peer computing device; and other identification of the second peer computing device; update a list identifying peer computing devices that have responded to indicate the address resolvable to the IP address and the other identification of the second peer computing device; determine which collaborative networks are active on the peer-to-peer network by querying the second peer computing device; select one of the active collaborative networks determined from the second peer computing device; and collaborate with the second peer computing device connected to the selected active collaborative network; further comprising: the first peer computing device maintaining a record of an interval since a last message from a peer computing device other than the first peer computing device; and when a predetermined threshold is exceeded for the interval, removing the peer computing device other than the first peer computing device from the list.

* * * * *

UNITED STATES PATENT AND TRADEMARK OFFICE
CERTIFICATE OF CORRECTION

PATENT NO. : 7,613,772 B2 Page 1 of 1
APPLICATION NO. : 10/206009
DATED : November 3, 2009
INVENTOR(S) : Bartram et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 804 days.

Signed and Sealed this

Nineteenth Day of October, 2010

David J. Kappos
*Director of the United States Patent and Trademark Office*